United States Patent Office 2,710,869
Patented June 14, 1955

2,710,869

PROCESS FOR PREPARING CYANOPYRIDINES

Bernard F. Duesel, Yonkers, and Harold Berman, Bronx, N. Y., assignors to Nepera Chemical Co. Inc., Yonkers, N. Y., a corporation of New York No Drawing. Application June 20, 1951,
Serial No. 232,678

14 Claims. (Cl. 260—294.9)

This invention relates to the production of cyanopyridines, and particularly to the production of nicotinonitrile from nicotinic acid, from crude nicotinic acid, and from pyridine dicarboxylic acids having one carboxyl group in the beta position. These dicarboxylic acids, and especially quinolinic acid and isocinchomeronic acid, can be synthesized with comparative ease is will be seen from the specification.

Nicotinonitrile (3-cyanopyridine) is an important intermediate for the production of nicin and niacinamide. Almost all the niacinamide used today is produced by hydrolyzing nicotinonitrile. The nitrile may be prepared by treating 3-halopyridines with copper cyanide. However, due to the high cost and difficulties of producing 3-chloropyridine or 3-bromopyridine, the method of producing nicotinonitrile heretofore commercially practiced is from 3-pyridine sulfonate by fusion with alkali cyanides.

The 3-pyridine sulfonate is produced by sulfonating pyridine, but the supply of the latter substance is decreasing and it is in demand for other purposes. An object of our invention is to provide a process for a new and more economical synthesis of nicotinonitrile on a commercial scale.

According to the present invention, we produce nicotinonitrile from nicotinic acid, quinolinic acid and isocinchomeronic acid with a very satisfactory yield by a new process. Furthermore, we can produce pure nicotinonitrile from the crude, unrefined above mentioned acids. Since the nicotinonitrile may be hydrolzed into nicotinic acid, our process may be used for the purification of crude nicotinic acid.

The above mentioned pyridine dicarboxylic acids may be manufactured by well-known procedures. Quinolinic acid may be produced by oxidizing quinoline with manganese dioxide. A mixture of isocinchomeronic and nicotinic acids may be produced by oxidizing aldehyde collidine with nitric acid. In processes heretofore used for preparing nicotinamide from these raw materials, the crude dicarboxylic acids have been converted into respective copper salts, from which the pure free acids have been liberated with alkali, and then decarboxylated by various methods to obtain nicotinic acid, which must be purified by recrystallization. To produce nicotinamide, the acid is esterified and amidated with ammonia.

It can be readily seen that the described procedure is cumbersome and expensive. In our process we obtain in one step pure nicotinonitrile, which is easily hydrolizable to nicotinic acid, or directly to nicotinic amide as described in U. S. Patent No. 2,471,518 of May 31, 1949.

The principal object of this invention is to produce pure nicotinonitrile in a one-step operation.

Another object is to produce pure nicotinonitrile from crude nicotinic acid.

Still another object is to produce nicotinonitrile from pyridine dicarboxylic acids, one of the carboxyl groups being in the 3-position and the other in the 2-, 4-, or 6-position.

Other objects of the invention include the production of pure isonicotinic acid from the corresponding crude acid or acid amide.

The classical method of preparing nitriles is from their corresponding acids, by distilling their ammonium salts, or better their amides, with a dehydrating agent, such as phosphorus pentoxide, phosphorus pentachloride or thionyl chloride. While the above mentioned process is applicable to aliphatic and aromatic acids, when it is applied to pyridine carboxylic acids, not only are the yields poor, but the unreacted carboxylic acids are not recoverable.

We have now found that we can produce nicotinonitrile in good yield by our new process from nicotinic, quinolinic, cinchomeronic, and isocinchomeronic acids, their ammonium salts or their amides, without the use of dehydrating agents. Our method may be called a liquid phase catalytic process since we melt our raw material and employ our reagent in very much less than equimolecular quantities.

Our catalysts may be selected from a wide range of materials, all of which contain an acid radical and are designated as anionic catalysts. Thus, the ammonia, alkali metal, alkaline-earth metal and some of the heavy metal salts of hydrochloric, sulfuric and phosphoric acids are satisfactory as catalysts for the reaction. Alternatively, any of these free acids in about 1% quantity will catalyze our reaction. Salts of basic organic substances also catalyze the nitrile formation, and we may also use certain substituted acid derivatives, such as sulfamic acid.

Besides the above mentioned acids, we may also employ weaker acids, like boric, or silicic acids, but with these acids the yields are not so favorable. Some metal salts, copper salts for instance, have an influence toward complete decarboxylation and a large amount of pyridine forms in the reaction. While organic acids also induce the nitrile formation, they are not satisfactory because the purification of the nitrile is difficult, due to the large quantity of by-products.

The use of catalytic amounts of reagent makes it possible to recover large portions of the starting material which would otherwise be lost. For example, when stoichiometric amounts of sulfamic acid are employed in the procedure, the yield is 40.2% with the recovery of the starting material being impractical. When only 1% sulfamic acid is used, the yield is 75% with 15% of the starting material being recovered.

In carrying out our invention, we place the pyridine carboxylic acids into a vessel equipped with a stirrer, add sufficient aqueous ammonia to obtain the ammonium salt, distill off the water, and add the catalyst to the molten mass. Instead of the acid, we may start directly with the ammonium salt or the acidamide. After the catalyst is added, we continue the heating while continuously stirring and distill off the water and nitrile formed, the nitrile formation taking place at about 270° C. The nitrile is collected in a cooled receiver, and is usually contaminated with some niacin and niacinamide which codistill during the reaction, as well as with the water formed in the reaction. These can be readily separated by stirring the mixture with benzene or a similar solvent in which only the nitrile is soluble. The aqueous layer and the insoluble niacin and niacinamide are separated and may be returned to the next reaction mixture.

We can also employ our reaction for the purification of very crude niacin, its ammonium salts, or its amide. In such cases, the nitrile distills off the reaction mass, leaving a highly colored residue.

Where the starting material is derived from a dicarboxylic acid, the reaction melt is held at a suitable temperature, preferably approximately 200° C., until $CO_2$ evolution has ceased, after which the catalyst is added and the reaction continued to complete the nitrile formation. In some instances it is advantageous to pass ammonia into the reaction at the start or during the reaction.

When we start with mixtures of crude or pure picolinic, nicotinic, and isonicotinic acids we transform them by our reaction into the corresponding mixed nitriles, which may be separated by fractionation in an efficient column.

The following are several illustrative examples of some of the preferred procelures of carrying out the present invention, which are given for illustration and not for limitation.

*Example 1*

615 grams of nicotinic acid were dissolved in 300 ml. of concentrated ammonia water. The solution was poured into a three-neck flask equipped with a stirrer, thermometer and distilling condenser. The mixture was gradually heated to 200° C., the aqueous distillate collected and then ammonia was passed into the melt while it was held at that temperature for a period of 5 hours. Then 6 grams of diammonium hydrogen phosphate were added as catalyst and the temperature was raised to 275° C., when the nitrile began to distill out of the reaction mixture. In about an hour the distillation slowed down and the temperature was slowly raised to 300° C. at which point the reaction was finished.

The combined distillates were extracted with a total of one liter of benzene to separate the nitrile from the nicotinic acid and nicotinic acid amide, which codistilled with it. The benzene solution was separated from the aqueous layer and fractionated. First, the benzene distilled off with a negligible amount of pyridine and the fraction boiling at 200–205° C. was collected. 407 grams of nicotinonitrile were obtained, representing a conversion of 76%. 77 grams of nicotinic acid were recovered from the aqueous layer. Based on the nicotinic acid consumed, the yield was 89% of theory.

*Example 2*

The reaction was run as in Example 1, except that 6 grams of sulfuric acid were added as the catalyst. In this instance the conversion to nitrile was 71% and the yield based on the nicotinic acid consumed was 88.9%.

*Example 3*

The reaction was run as in Example 1, except that 47.5 grams of ferric sulfate were added as the catalyst. The reaction temperature was slightly higher than in Example 1. The conversion to nitrile was 65% and the yield based on the niacin consumed was 85%.

*Example 4*

738 grams of nicotinic acid were placed into a three-neck-flask as in the previous examples and anhydrous ammonia bubbled through at 200° C. for 5 hours. 36 grams of nickel sulfate hexahydrate was then added and the temperature raised to 270° C. and while the bubbling of ammonia gas was continued, the distillate was collected. The nitrile formed was extracted from the distillate with ethylether. The ether layer was separated and dried with anhydrous sodium sulfate. After the ether was distilled off, the remaining nitrile weighed 395 grams. This represents 63.7% conversion.

*Example 5*

90 grams of crude pyridine carboxylic acids, obtained by the oxidation of aldehyde collidine and containing about 37% of nicotinic acid, 33% of isocinchomeronic acid, water and other unknown impurities were placed into a three-neck flask, heated to 200° C. until the evolution of $CO_2$ stopped and then worked up as in Example 1, one gram of diammonium hydrogen phosphate being used as a catalyst. The conversion and yield obtained, based on the nicotinic acid and isocinchomeronic acid content of the original crude mixture, was similar to that obtained in Example 1.

*Example 6*

66 grams of crude quinolinic acid, obtained by oxidation of quinoline with manganese dioxide, were placed into a three-necked flask equipped with a stirrer, thermometer and distilling condenser and 85 cc. of 28% ammonia water was added. The reaction mixture was heated slowly, distilling off water and allowing one hour at approximately 200° C. for the evolution of $CO_2$. Then 0.6 gram of diammonium hydrogen phosphate was added as catalyst and the working up proceeded as in Example 1. The conversion and yield obtained were similar to the results in Example 1.

*Example 7*

70 grams of ammonium nicotinate were placed into a three-neck flask as in the previous examples and 2 grams zinc sulfate were added as a catalyst. The reaction mixture was slowly heated and the resulting nitrile distilled over and collected. The distillate was purified by extraction with benzene. The conversion to nitrile was 38.6%, and most of the unreacted nicotinic acid was recovered.

*Example 8*

122 grams of nicotinamide were heated with 1.2 grams of zinc sulfate to 270° C. and the resulting nitrile distilled over. The distillate was worked up as in Example 1. 71.8 grams of nicotinonitrile were obtained, which was a conversion of 69.1%. The unreacted starting material was recovered as nicotinic acid, and the yield, based on the acid consumed, was 86.6%.

*Example 9*

244 grams of nicotinamide were heated with 12 grams of nickel sulfate hexahydrate to 285° C. and the resulting nitrile was distilled over. The distillate was worked up as in Example 4 and the unreacted starting material was recovered from the aqueous layer as nicotinic acid. The conversion to nicotinonitrile was 74.8% and the yield based on consumed nicotinic acid was 91%.

*Example 10*

122 grams of nicotinamide were heated with 12.2 grams of calcium sulfate to 290–300° C. and the nitrile formed was distilled over. The reaction was worked up as in Example 1. The conversion to nicotinonitrile was 57.9% and the yield 73.6%.

*Example 11*

122 grams of nicotinamide were heated with 12.2 grams of sodium sulfate to 290–320° C. and the nitrile formed was distilled over. The reaction was worked up as in Example 1. The conversion to nicotinonitrile in this case was 58.5% and the yield 88.5%.

*Example 12*

122 grams of nicotinamide were heated with 2 grams of nicotinic acid sulfate to 280° C. and the nitrile formed was distilled over. The reaction was worked up as in Example 1. The conversion to nicotinonitrile was 53.3% and the yield 74.9%.

*Example 13*

122 grams of nicotinamide were heated with 12.2 grams of ammonium chloride to 275–300° C. and the nitrile formed was distilled over. The reaction was worked up as in Example 1. The conversion to nicotinonitrile was 49.3% and the yield 59.6%.

*Example 14*

122 grams of nicotinamide were heated with 12.2 grams of sulfamic acid to 270 °C. and the nitrile formed was distilled over. The reaction was worked up as in Example 1. The conversion to nicotinonitrile was 74.7% and the yield 81.5%.

Example 15

122 grams of nicotinamide were heated with 12.2 grams of boric acid to 270° C. and the resulting nitrile was distilled over. The reaction was worked up as in Example 1. The conversion to nicotinonitrile was 65% and the yield 74%.

Example 16

122 grams of nicotinamide were heated with 12.2 grams of silicic acid to 280° C. and the resulting nitrile was distilled over. The reaction was worked up as in Example 1. The conversion to nicotinonitrile was 53.3% and the yield 74.9%.

Our reaction can also be applied to the recovery of nicotinic acid derivatives from the mother liquor residues in the manufacture of nicotinamide by the method of sulfonating pyridine which contain the isomeric amides formed in the process. While this isomer formation is comparatively small, and in laboratory experiments negligible, in large scale manufacture these residues represent a considerable economic loss. These residues contain, besides the three isomeric pyridine carboxamides, some sodium nicotinate and other unidentified by-products and impurities and are of a dark brown color. Due to the similar properties of picolinamide, nicotinamide and isonicotinamide, further fractional crystallization does not separate the desired nicotinamide. On the average these residues contain about 65% nicotinamide, 4% picolinamide and 12% isonicotinamide; the balance consists of the other impurities above mentioned.

By applying the process described in the examples above we can regenerate these amides into the corresponding nitriles, which in turn can be fractionated with an efficient fractionating column.

Example 17

150 grams of the above crude residue representing about 122 grams of the three isomeric pyridine carboxamides were heated with 1.2 grams of diammonium hydrogen phosphate to 270–300° C. and the formed nitriles were distilled over. The reaction was worked up as in Example 1. The yield of the mixed nitriles was similar to that obtained in Example 1. The nitriles were fractionated and the purified nitriles were obtained in about the proportion stated above.

Example 18

16.86 grams of isonicotinamide (4-pyridine carboxamide) were placed into a flask with 0.17 gram of diammonium-hydrogenphosphate. The reaction mixture was heated to about 290° C. and the formed nitrile distilled over. The distillate was worked up as in Example 1. 9.8 grams of isonicotinonitrile were collected, which is a conversion of 68.5%.

Having so described our invention, we do not limit ourselves to the specifically mentioned times, temperatures, quantities, chemicals or steps of procedure as these are given simply to clearly describe our invention as set forth in our specification and claims.

What we claim is:

1. The process of producing a cyanopyridine, which comprises heating a pyridine mono-carboxamide in the liquid phase and in the presence of an anionic catalyst selected from the group consisting of boric acid, silicic acid, sulfamic acid, nicotinic acid sulfate, the ammonium, alkali-metal, alkaline-earth metal and zinc, iron and nickel salts of hydrochloric, sulfuric and phosphoric acid to a temperature of over 280° C. and, while maintaining the reaction mixture at said temperature, distilling off the cyanopyridine formed.

2. The process of producing a mixture of isomeric cyanopyridines, which comprises heating a mixture of isomeric pyridine mono-carboxamides in the liquid phase in the presence of an anionic catalyst selected from the group consisting of boric acid, silicic acid, sulfamic acid, nicotinic acid sulfate, the ammonium, alkali-metal, alkaline-earth metal, and zinc, iron and nickel salts of hydrochloric, sulfuric and phosphoric acid to a temperature of over 280° C., and, while maintaining the reaction mixture at said temperature, distilling off a mixture of isomeric cyanopyridines.

3. The process of producing nicotinonitrile, which comprises heating nicotinamide in the liquid phase and in the presence of an anionic catalyst selected from the group consisting of boric acid, silicic acid, sulfamic acid, nicotinic acid sulfate, the ammonium, alkali-metal, alkaline-earth metal, and zinc, iron and nickel salts of hydrochloric, sulfuric and phosphoric acid to a temperature of over 280° C., and, while maintaining the reaction mixture at said temperature, distilling nicotinonitrile therefrom.

4. The process of producing isonicotinonitrile, which comprises heating isonicotinamide in the liquid phase and in the presence of an anionic catalyst selected from the group consisting of boric acid, silicic acid, sulfamic acid, nicotinic acid sulfate, the ammonium, alkali-metal, alkaline-earth metal, and zinc, iron and nickel salts of hydrochloric, sulfuric and phosphoric acid to a temperature of over 280° C., and, while maintaining the reaction mixture at said temperature, distilling isonicotinonitrile therefrom.

5. The process of producing picolinonitrile, which comprises heating picolinamide in the liquid phase and in the presence of an anionic catalyst selected from the group consisting of boric acid, silicic acid, sulfamic acid, nicotinic acid sulfate, the ammonium, alkali-metal, alkaline-earth metal, and zinc, iron and nickel salts of hydrochloric, sulfuric and phosphoric acid to a temperature of over 280° C., and, while maintainnig the reaction mixture at said temperature, distilling piconinonitrile therefrom.

6. The process of producing nicotinonitrile, which comprises heating nicotinamide in the liquid phase and in the presence of a catalyst containing a sulfate group to a temperature of over 280° C. and, while maintaining the reaction mixture at said temperature, distilling nicotinonitrile therefrom.

7. The process of producing nicotinonitrile, which comprises heating nicotinamide in the liquid phase and in the presence of a catalyst containing a phosphate group, to a temperature of over 280° C. and, while maintaining the reaction mixture at said temperature, distilling nicotinonitrile therefrom.

8. The process of producing isonicotinonitrile, which comprises heating isonicotinamide in the liquid phase and in the presence of a catalyst containing a sulfate group to a temperature of over 280° C. and, while maintaining the reaction mixture at said temperature, distilling isonicotinonitrile therefrom.

9. The process of producing isonicotinonitrile, which comprises heating isonicotinamide in the liquid phase and in the presence of a catalyst containing a phosphate group to a temperature of over 280° C. and, while maintaining the reaction mixture at said temperature, distilling isonicotinonitrile therefrom.

10. The process of producing nicotinonitrile, which comprises heating nicotinamide in the liquid phase and in the presence of diammonium hydrogen phosphate to a temperature of over 280° C. and, while maintaining the reaction mixture at said temperature, distilling nicotinonitrile therefrom.

11. The process of producing isonicotinonitrile, which comprises heating isonicotinamide in the liquid phase and in the presence of diammonium hydrogen phosphate to a temperature of over 280° C. and, while maintaining the reaction mixture at said temperature, distilling isonicotinonitrile therefrom.

12. The process of producing nicotinonitrile, which comprises heating nicotinamide in the liquid phase and in the presence of sodium sulfate to a temperature of over 280° C. and, while maintaining the reaction mixture at said temperature, distilling nicotinonitrile therefrom.

13. The process of producing nicotinonitrile, which comprises heating nicotinamide in the liquid phase and in the presence of calcium sulfate to a temperature of over 280° C. and, while maintaining the reaction mixture at said temperature, distilling nicotinonitrile therefrom.

14. The process for producing isomeric cyanopyridines, which comprises heating a mixture of isomeric pyridine mono-carboxamides in the liquid phase and in the presence of diammonium hydrogen phosphate to a temperature of over 280° C., and while maintaining the reaction mixture at said temperature, distilling off a mixture of isomeric cyanopyridines.

References Cited in the file of this patent

UNITED STATES PATENTS

| Number | Name | Date |
|---|---|---|
| 2,166,971 | Schmidt et al. | July 25, 1939 |
| 2,300,741 | Cislak et al. | Nov. 3, 1942 |
| 2,314,843 | Hultquist | Mar. 23, 1943 |
| 2,389,065 | Lee et al. | Nov. 13, 1945 |
| 2,412,749 | Pike et al. | Dec. 17, 1946 |
| 2,419,831 | Garbo | Apr. 29, 1947 |
| 2,427,400 | Garbo | Sept. 16, 1947 |
| 2,437,938 | Cislak et al. | Mar. 16, 1948 |
| 2,450,386 | Short et al. | Sept. 28, 1948 |
| 2,453,706 | Garbo | Nov. 16, 1948 |
| 2,456,380 | Cislak et al. | Dec. 14, 1948 |
| 2,460,002 | Garbo | Jan. 25, 1949 |
| 2,510,605 | Porter et al. | June 6, 1950 |

OTHER REFERENCES

Elderfield: "Heterocyclic Compounds" (1950), vol 1, pp. 568–71.